April 27, 1948.   T. M. KERR   2,440,406

FRUIT JUICE DISPENSER

Filed Nov. 6, 1944

INVENTOR.
Thomas M. Kerr
BY Carlos G. Stratton
ATTORNEY

Patented Apr. 27, 1948

2,440,406

UNITED STATES PATENT OFFICE 2,440,406

FRUIT JUICE DISPENSER

Thomas M. Kerr, Los Angeles, Calif.

Application November 6, 1944, Serial No. 562,084

8 Claims. (Cl. 225—21)

This invention relates to fruit juice dispensers, and particularly to a dispenser having spaced transparent walls and a built-in display fountain for attracting the customers' attention, said fountain being operated continuously, if desired, by a concealed pump and control valve unit.

The display fountain of my dispenser has the advantage of constantly circulating the fruit juice, thereby preventing any solid or immiscible components of the juice from settling or stratifying to a serious degree. Undue settling of any solid components might clog the dispensing conduit or faucet, while stratification prevents a uniform mixture from being dispensed and presents an unsightly appearance to potential customers.

For refilling and juice circulation purposes, my dispenser is provided with a detachable valve housing unit which contains the control valve, and supports the pump unit. Said valve has at least two operative positions, one of which shuts off the flow of fruit juice from the base of the dispenser container to the pump while said container is being filled; and the other of which shuts off the filling inlet, while the juice is being pumped or recirculated through the fountain. I may also provide an intermediate or third position of the valve, which shuts off the flow of juice both from the fountain inlet and filling inlet. The concealed pump unit may be readily removed from said detachable housing, for replacement or repairs, without disturbing the dispensing function of said container, while said valve is in either the first or third positions.

The insulating effect of the space between the transparent walls of the dispenser container, is sufficient to prevent the juice or fountain display being concealed from customers, by the formation of condensation on the outside of the outer wall from the cooling effect of the chilled fruit juice which is continuously sprayed upon the inside of the inner wall.

My dispenser container is also provided with an air vent which both limits the depth to which said container can be filled, and allows the displaced air in the container to escape as it is being filled, and to return as it is emptied.

The dispenser container may be mounted above the counter, with the valve housing and pump unit located beneath the counter, or all three parts may be supported as a unit above the counter and an apron member provided to conceal the valve and pump units.

The principal object of my invention is to provide an improved fruit juice dispenser, in which the dispenser container is made of transparent material and houses a built-in display fountain.

Another object of my invention is to provide a concealed pump and control valve unit, for operating a built-in display fountain in the dispenser container, by continuously circulating the residual fruit juice against the upper portion of the inside transparent wall.

Another object of my invention is to provide a fruit juice dispenser with spaced transparent walls, for preventing the fountain and contents being concealed from the customers by the formation of condensed moisture or frost on the outside of the outer wall.

A further object of my invention is to provide a fruit juice dispenser which is economical in design and operation, and which has a built-in display fountain operated by a removable valve and pump unit; said pump also being separately removable, when said valve is closed, without disturbing the dispensing function.

A further object of my invention is to provide a fruit juice dispenser with a simplified form of valve having at least two operative positions which enable the concealed pump unit either to operate the built-in fountain or to refill the dispenser container.

An additional object of my invention is to provide a fruit juice dispenser with an air vent both for limiting the depth to which the dispenser may be filled, and for permitting the escape and return of the displaced air.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiment of the present invention, which is given by way of illustration or example only.

In the drawings, like reference characters designate similar parts in the several views.

Figure 1:
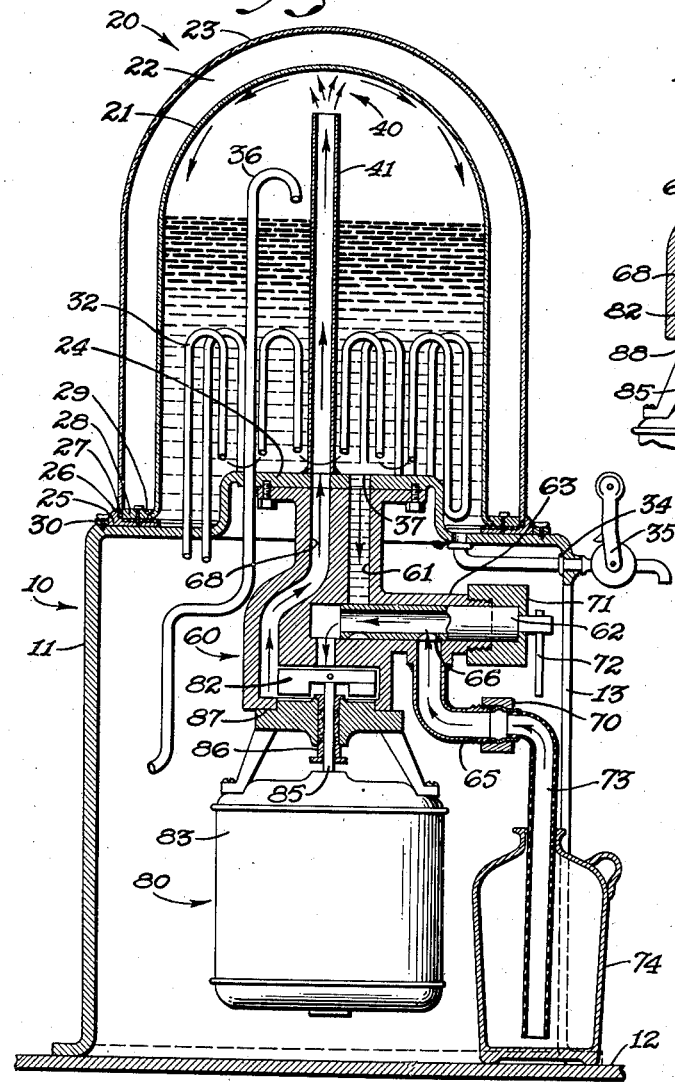
Fig. 1 is a partially diagrammatic vertical cross section taken through the center of my dispenser, and shows the control valve in filling position.

The fruit juice dispenser of my invention consists in general of a supporting stand 10, container 20, fountain 40, valve housing unit 60, and pump unit 80. The stand 10 comprises an apron member 11, of any desired shape, which serves to conceal the valve housing 60, and pump unit 80 from the view of customers, and need not be used where said housing and pump units are supported beneath a counter 12, instead of on the counter as illustrated. The apron 11 may support the weight of all the parts as shown, or may be carried on supporting legs (not shown). The stand 10 has a door opening 13 in the back to provide access to control valve 62, filling conduit 65, and to said housing and pump units 60 and 80.

The container 20 for the fruit juice comprises transparent walls, having the shape of inverted, nested bell jars 21 and 23, as shown, or any other desired shape, and having an insulating space 22 between said jaws. Additional walls and spaces may be provided if desired, although the single space 22 will ordinarily be sufficient to prevent the chilled juice in jar 21 from condensing moisture or frost on jar 23.

The bottom edges of said jars 21 and 23 are supported in any desired manner on the rim portion of wall 24, which may be regarded as the bottom wall of container 20, or as the top wall of stand 10. Said bottom edges of jars 21 and 23 may be hermetically sealed in a manner known to the art, or may, as shown in Fig. 1, be supported on peripheral bands 25, 28 conforming to the cross sectional shape of said jars. The lower band 25 is joined in a liquid tight manner with bottom wall 24, and has a shoulder 26 spaced from clamping band 28 for receiving a gasket tubing 27 which supports the bottom edge of outer jar 23. The upper band 28 has a shoulder 29 for clamping the outwardly turned bottom edge of inner jar 21 in a liquid tight manner against band 25. A trim strip 30 may be secured to bottom wall 24 to prevent the contents of jar 21 from tending to spread the bands 25 and 28, and thus causing leakage of said contents.

Refrigerating coils 32 are supported inside jar 21 for chilling the fruit juice, and are ordinarily concealed by the juice or fountain spray 40. The refrigerating unit comprises a series of coils 32, which are vertically disposed and annularly spaced to afford free circulation of the juice thereabout and to prevent accumulation of the solid or pulpous matter in the juice thereon. The juice is dispensed from the container 20 by conduit 34 and faucet 35. An air vent 36, supported inside jar 21, also limits the depth to which the container may be filled.

Figure 2:
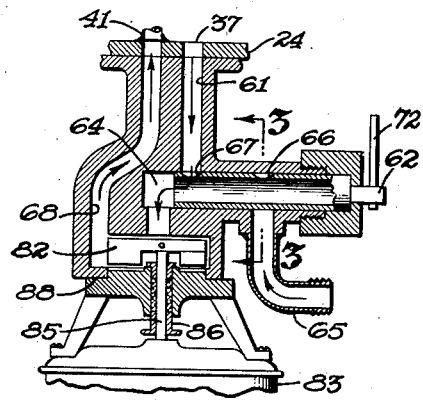
Fig. 2 is a fragmentary view of the control valve housing and pump units of Fig. 1, but shows the valve in circulating position.

The valve housing 60 is detachably connected in a liquid tight manner to the bottom side of bottom wall 24, and is provided with a passageway 61 which aligns with a circulating outlet 37 in wall 24. A hollow cylindrical valve 62 is rotatably mounted in a cylindrical housing 63, the interior of which communicates with a chamber 64 leading to the pump 82 of unit 80. The tubular wall of said valve 62 has two longitudinally aligned openings 66 and 67, for controlling the fountain and filling operation, the opening 66 aligning with the filling conduit 65, as shown in Fig. 1, and the opening 67 aligning with passageway 61, as shown in Fig. 2. A passageway 68 leads from pump 82 to the fountain conduit 41 secured to the wall 24 inside jar 21. A nut 71 is provided on the outer end of cylindrical housing 63 for detachably securing the valve 62 in place, and a slip handle 72 is provided for rotating the valve. The filling conduit 65 is normally closed by a cap member 75 (see Fig. 3), which is replaced by the union 70 and hose 73, whenever it is desired to replenish the fruit juice in the dispenser from a supply receptacle 74.

The centrifugal pump 82, or any other suitable type, is actuated by an electric motor 83, or any other suitable means, and is detachably secured as a unit to the bottom of valve housing 60, with the pump vanes arranged to pump the juice in chamber 64 to the container 20 through passageway 68 and fountain conduit 41. The shaft 85 of motor 83 is provided with a liquid tight packing gland 86, while the detachable connection 88 between the pump housing 87 and the valve housing 62 is made liquid tight in any suitable manner.

*Operation*

Referring to Fig. 1, the container 21 has just been filled with fruit juice from supply receptacle 74 by the suction of pump 82 drawing the juice through hose 73, supply conduit 65, valve opening 66, and valve 62, into chamber 64, from which it was forced by pump 82 through passageway 68 and fountain conduit 41 into the container. By rotating control valve 62 to the position shown in Fig. 2, a part of the juice will be withdrawn continuously from the container 21 through the circulating bottom outlet 37, passageway 61, valve opening 67, and valve 62 into chamber 64, from which it is continuously forced by pump 82 through passageway 68 and fountain conduit 41 against the inside surface of the top portion of container 21, thereby creating a display fountain for attracting the attention of potential customers.

Figure 3:
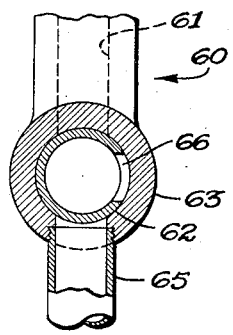
Fig. 3 is an enlarged detail sectional view taken on the line 3—3 of Fig. 2, but shows the valve in an intermediate position.

For replenishing the juice in container 21, or for replacing the pump unit 80, the valve 62 is rotated momentarily to the neutral position of Fig. 3, to allow the juice inside the valve 62 and in chamber 64 to be pumped into the container 21, so that it will not drain into the filling conduit 65 upon shutting off the pump motor 83 and turning the valve 62 to the position shown in Fig. 1. In either case, the juice can continue to be dispensed from container 21, through conduit 34 and faucet 35, even when the pump unit is removed, or while the container 21 is being filled. It will be understood that the fountain is intended to operate continuously during the business period.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A fruit juice dispenser comprising: a transparent container for the juice; a faucet for dispensing juice from the bottom of said container, a fountain conduit having its outlet in the upper portion of said container; a circulating outlet in the bottom portion of said container; a housing secured to the bottom of said container having a passage communicating with said conduit and a passage communicating with said outlet, said housing having a valve chamber and a filling inlet communicating therewith a concealed pump for continuously withdrawing part of the fruit juice through said circulating bottom outlet and for forcing it through said conduit into the top portion of said container to form a display fountain; and a tubular valve in said chamber for controlling the flow of juice from said circulating bottom outlet to said pump at one time and from said filling inlet to said pump at another time, said pump being removable from said housing without interfering with the dispensing function of said container, when said valve is in neutral position.

2. A fruit juice dispenser comprising; a transparent container for the juice; a faucet for dispensing juice from the bottom of said container; a fountain conduit having its outlet in the upper portion of said container; a circulating outlet in the bottom portion of said container; a concealed valve housing connected to the bottom of said container; a valve in said housing; a concealed pump unit detachably secured to said valve housing; and said housing having a passageway leading from said circulating bottom outlet through said valve to said pump and thence to said fountain conduit, when said valve is open, whereby said pump unit may be removed from said housing when said valve is closed, without interfering with the dispensing function of said container.

3. In a fruit juice dispenser, the combination of: a transparent container for the juice having a bottom provided with a circulation inlet and a circulation outlet; a fountain conduit communicating with said circulation inlet and having its outlet in the upper portion of said container; a housing attached to the bottom of said container having a passageway communicating with said inlet and a circulation passageway communicating with said outlet; a pump attached to said housing to withdraw part of the juice through said circulation passageway and force it through said conduit to form a display fountain; a valve chamber in said housing and between said circulation passageway and said pump, said chamber having a juice supply inlet; a tubular valve in said chamber having ports, said valve being operable at different times to register one of the ports with said circulation passageway to effect circulation of the juice through said housing and conduit, to seal said circulation port and register the other port with said inlet supply, and to neutral position to seal both said circulation passageway and said supply inlet, and means to dispense juice from said container independently of said pump and the position of said valve.

4. A fruit juice dispenser comprising: a transparent container having a circulating outlet in the bottom thereof; a faucet for dispensing juice from the bottom of said container; a fountain conduit having its outlet in the upper part of said container; a housing connected to the bottom of said container, said housing provided with a passageway communicating with the outlet in said container and with a passageway communicating with said conduit; a pump detachably secured to said housing, and a valve in said housing operable at one time to control the circulation of the juice through said passageways, and at another time to stop the circulation therethrough, said pump being removable from said housing, when said valve is closed, without interfering with the dispensing function of said container.

5. In a fruit dispenser, the combination of: a container for the juice having a circulation inlet and a circulation outlet; a fountain conduit communicating with said circulation inlet and having its outlet in the upper part of said container; a housing attached to the bottom of said container having a passageway communicating with said inlet and a circulation passageway communicating with said outlet; a pump attached to said housing to withdraw the juice through said circulation passageway and force it through said conduit to form a display fountain; a valve in said housing and between said circulation passageway and said pump, said housing having a juice supply inlet; and said valve being operable at different times to control circulation of the juice through said housing and conduit, to seal the circulation passageway and open the juice supply inlet, and to neutral position to seal both said circulation passageway and said supply inlet, an air vent for limiting the depth to which the container may be filled and removing the air displaced by the filling operation, and means to dispense juice from said container independently of said pump and the position of said valve.

6. A fruit juice dispenser comprising: a transparent container for the juice; a cooling coil in said container of vertical pipes annularly disposed; a faucet for dispensing juice from the bottom of said container; a fountain conduit having its outlet in the upper part of said container; a circulating outlet in the bottom portion of said container, a housing detachably secured to the bottom of said container, said housing having passageways respectively communicating with said fountain conduit and circulating outlet, and a valve chamber, a filling inlet communicating therewith, a pump carried by said housing; a valve in said chamber for controlling circulation of juice through said fountain conduit and circulation outlet or controlling the flow of juice from said filling inlet to said pump, said valve having a neutral position whereby the juice is unaffected by the operation of the pump and dispensing of juice from the container is not interfered with.

7. In a fruit juice dispenser, the combination of: a container, a cooling unit in said container comprising vertical pipes annularly spaced, said container having a circulating outlet in the bottom thereof, a fountain conduit having its outlet in the upper part of said container, an air vent in said container, a housing connected to the bottom of said container, including a detachable pump and a valve chamber, and provided with passageways, registering with the conduit and circulating outlet of said container, and with a juice supply inlet, a ported valve in said chamber operable in one position to establish communication between said juice supply inlet and passageway leading to said conduit to supply juice to the container, in another position to close said supply inlet and open communication between said outlet and conduit to effect circulation of the juice and to neutral position to seal both the circulation passageways and supply inlet without interfering with the continuous operation of the pump, and a faucet to dispense juice from said container at all times.

8. A fruit juice dispenser comprising: a transparent container for the juice, a cooling unit in said container comprising a series of annularly spaced vertical pipes, a fountain conduit having its outlet in the upper portion of said container, a circulating outlet in the bottom portion of said container, concealed pump means for continuously withdrawing part of the fruit juice through said circulating bottom outlet and for forcing it through said conduit into the top portion of said container to form a display fountain, a filling inlet, and tubular valve means having at least two ports for selectively opening the flow of juice to said pump means from either said circulating bottom outlet or said filling inlet.

THOMAS M. KERR.

REFERENCES CITED

The following references are of record in the file of this patent:

UNITED STATES PATENTS

| Number | Name | Date |
|---|---|---|
| 1,804,519 | Smith | May 12, 1931 |
| 1,836,893 | Austin | Dec. 15, 1931 |
| 1,859,566 | Konikow | May 24, 1932 |